United States Patent
Luedtke et al.

(10) Patent No.: US 11,624,211 B2
(45) Date of Patent: Apr. 11, 2023

(54) SYSTEMS AND METHODS FOR MAGNET-EQUIPPED LOCKS

(71) Applicant: Lyft, Inc., San Francisco, CA (US)

(72) Inventors: Peter Rex Luedtke, San Francisco, CA (US); Andrew Paul Rosenkranz, Hoboken, NJ (US); Richard Stephen Chelminski, Oakland, CA (US); James Jeng-Yeu Peng, Emeryville, CA (US)

(73) Assignee: Lyft, Inc., San Francisco, CA (US)

( * ) Notice: Subject to any disclaimer, the term of this patent is extended or adjusted under 35 U.S.C. 154(b) by 197 days.

(21) Appl. No.: 16/805,653

(22) Filed: Feb. 28, 2020

(65) Prior Publication Data
US 2020/0332565 A1 Oct. 22, 2020

Related U.S. Application Data

(63) Continuation of application No. 16/389,843, filed on Apr. 19, 2019, now Pat. No. 10,577,834.

(51) Int. Cl.
*E05B 71/00* (2006.01)
*E05B 47/00* (2006.01)
(Continued)

(52) U.S. Cl.
CPC ............. *E05B 71/00* (2013.01); *B62H 5/003* (2013.01); *B62H 5/08* (2013.01); *B62H 5/145* (2013.01);
(Continued)

(58) Field of Classification Search
CPC ....... E05B 2045/065; E05B 2045/0665; E05B 47/00; E05B 47/0038; E05B 47/004;
(Continued)

(56) References Cited

U.S. PATENT DOCUMENTS

| | | | |
|---|---|---|---|
| 2,406,257 | A | 8/1946 | Romero et al. |
| 2,416,505 | A | 2/1947 | Trautner |

(Continued)

FOREIGN PATENT DOCUMENTS

| | | |
|---|---|---|
| CN | 101130358 A | 2/2008 |
| CN | 105026665 A | 11/2015 |

(Continued)

OTHER PUBLICATIONS

Luedtke et al., "Apparatus, Systems, And Methods For Single-Sided Locks", U.S. Appl. No. 16/389,837 dated Apr. 19, 2019, 73 pages.
(Continued)

*Primary Examiner* — Christopher J Boswell
(74) *Attorney, Agent, or Firm* — Baker Botts L.L.P.

(57) ABSTRACT

The disclosed computer-implemented method may include a magnetic insertable lock component with a magnet-sensing lock housing. By using a magnet within a pin and a magnetic field sensor within the lock housing, the apparatus may accurately detect the state of the lock. In some embodiments, the apparatus may determine the pin is inserted fully into the lock, the pin is inserted partially into the lock, the pin is not inserted in the lock, and/or that a foreign object that is not the pin is inserted into the lock. By using a magnet within the pin to track the state of the lock, the apparatus may improve both the user experience and the security of the lock. Various other methods, systems, and computer-readable media are also disclosed.

19 Claims, 13 Drawing Sheets

(51) Int. Cl.
*B62H 5/00* (2006.01)
*B62H 5/08* (2006.01)
*B62H 5/14* (2006.01)
*E05B 73/00* (2006.01)
*B62H 5/20* (2006.01)
*E05B 45/06* (2006.01)

(52) U.S. Cl.
CPC ...... *E05B 47/0038* (2013.01); *E05B 73/0005* (2013.01); *B62H 5/20* (2013.01); *E05B 2045/0665* (2013.01)

(58) Field of Classification Search
CPC ...... E05B 67/00; E05B 67/003; E05B 67/006; E05B 71/00; E05B 73/00; E05B 73/0005; E05B 73/0011; B62H 5/00; B62H 5/003; B62H 5/20
See application file for complete search history.

(56) References Cited

U.S. PATENT DOCUMENTS

| | | | |
|---|---|---|---|
| 3,438,227 A | 4/1969 | Wolniak | |
| 4,033,160 A | 7/1977 | Mima | |
| 4,536,754 A | 8/1985 | Holce et al. | |
| 4,920,334 A | 4/1990 | DeVolpi | |
| 5,212,972 A | 5/1993 | Kincaid et al. | |
| 5,270,681 A | 12/1993 | Jack | |
| 5,291,765 A | 3/1994 | Hoisington | |
| 5,372,019 A | 12/1994 | Hsiao | |
| 5,406,257 A | 4/1995 | Saito | |
| 5,408,213 A | 4/1995 | Ungarsohn | |
| 5,440,904 A | 8/1995 | Su | |
| 5,463,885 A | 11/1995 | Warren. , Sr. | |
| 5,488,844 A | 2/1996 | Winner | |
| 5,709,113 A | 1/1998 | Godfrey | |
| 5,823,025 A | 10/1998 | Phifer | |
| 5,917,407 A * | 6/1999 | Squire | B62H 5/00 235/382 |
| 6,761,051 B1 | 7/2004 | Tsai | |
| 6,965,294 B1 | 11/2005 | Elliott et al. | |
| 7,225,649 B2 | 6/2007 | Wyers | |
| 7,428,833 B2 | 9/2008 | Tollefson | |
| 7,594,416 B2 | 9/2009 | Bosin | |
| 7,631,525 B1 | 12/2009 | Kennealy | |
| 7,898,439 B2 | 3/2011 | Bettez et al. | |
| 8,065,895 B2 | 11/2011 | Andersen | |
| 8,225,629 B2 | 7/2012 | Zuraski et al. | |
| 8,770,453 B2 * | 7/2014 | Lang | E05B 73/0005 224/315 |
| 8,779,933 B2 | 7/2014 | Hartmann et al. | |
| 9,013,301 B2 | 4/2015 | Williams | |
| 9,206,624 B2 * | 12/2015 | Wheeler | E05B 73/0005 |
| 9,830,579 B2 | 11/2017 | Warren et al. | |
| 9,830,759 B2 | 11/2017 | Hilton et al. | |
| 10,131,390 B2 * | 11/2018 | Kalupner | B62H 5/145 |
| 10,577,834 B1 * | 3/2020 | Luedtke | E05B 71/00 |
| 10,689,046 B1 * | 6/2020 | Luedtke | B62H 5/141 |
| 10,991,250 B1 * | 4/2021 | Arnold | B62H 5/003 |
| 2005/0000255 A1 | 1/2005 | Wyers | |
| 2009/0201127 A1 | 8/2009 | Stobbe et al. | |
| 2010/0313614 A1 | 12/2010 | Rzepecki | |
| 2012/0299755 A1 | 11/2012 | Jones | |
| 2013/0036781 A1 | 2/2013 | Hartmann et al. | |
| 2013/0285393 A1 | 10/2013 | Roatis et al. | |
| 2020/0149316 A1 * | 5/2020 | Parker | E05B 73/0011 |
| 2020/0331549 A1 * | 10/2020 | Leudtke | B62H 5/145 |

FOREIGN PATENT DOCUMENTS

| | | |
|---|---|---|
| CN | 207725522 | 8/2018 |
| DE | 102014018476 | 12/2014 |
| EP | 1623914 A1 | 2/2006 |
| EP | 2039599 | 3/2009 |
| EP | 3069968 A1 | 9/2016 |
| KR | 20180015541 | 2/2018 |
| TW | M549183 | 9/2017 |
| WO | WO 2011/057755 | 5/2011 |

OTHER PUBLICATIONS

Luedtke et al., "Apparatus, Systems, And Methods For Rotating Lock Cables", U.S. Appl. No. 16/389,839 dated Apr. 19, 2019, 71 pages.
International Search Report and Written Opinion, PCT/US2020/028830, dated Jul. 28, 2020, 94 pages.
International Search Report and Written Opinion, PCT/US2020/028573, dated Jul. 15, 2020, 108 pages.
CN Office Action received for Patent Application No. 202080029671.4, 12 pages.

* cited by examiner

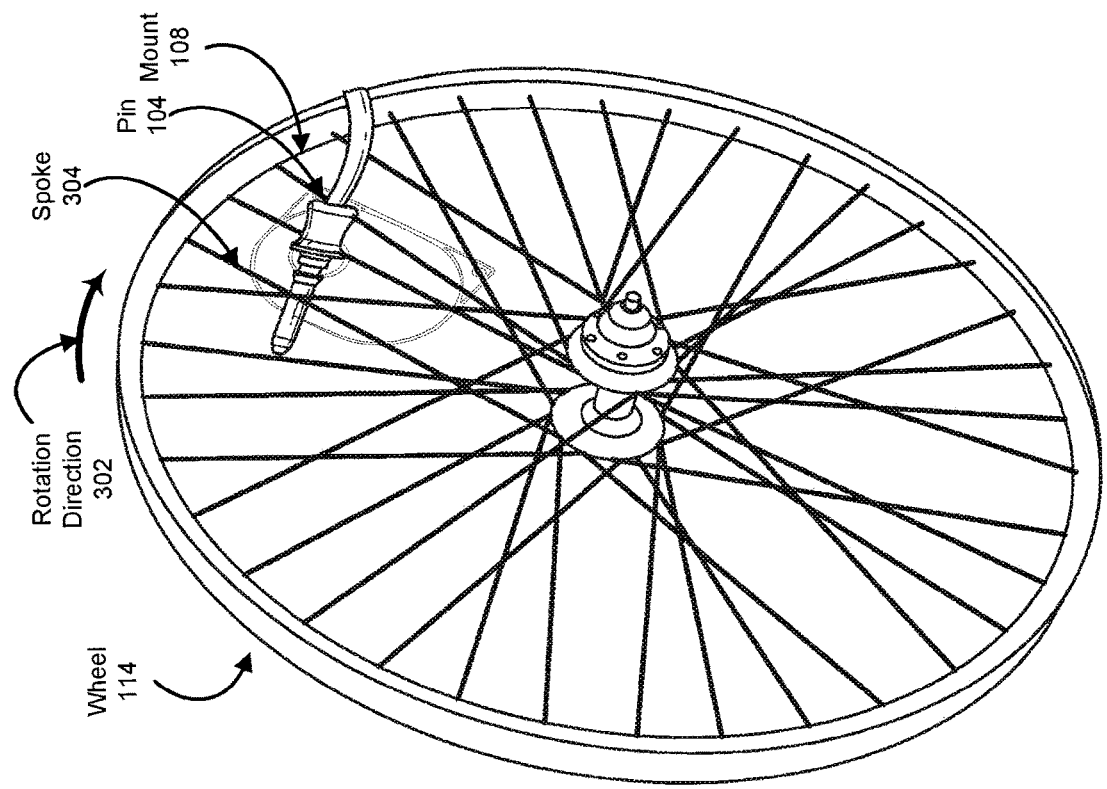
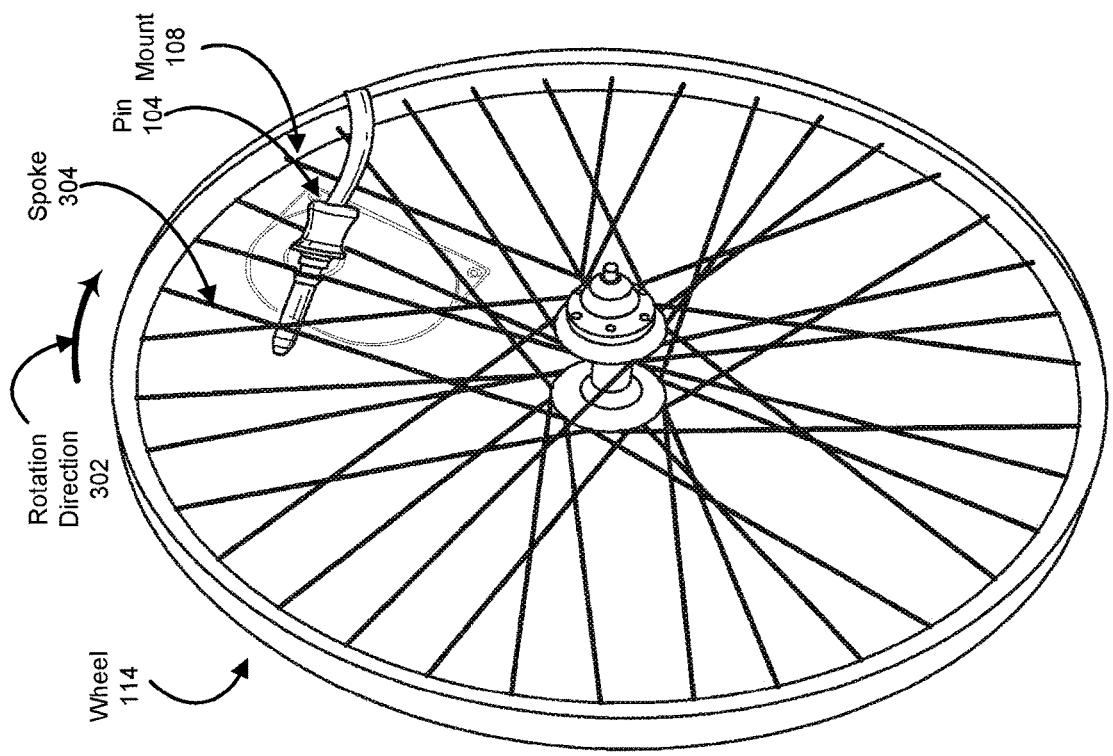

SYSTEMS AND METHODS FOR MAGNET-EQUIPPED LOCKS

CROSS REFERENCE TO RELATED APPLICATIONS

This application is a continuation of U.S. patent application Ser. No. 16/389,843, filed Apr. 19, 2019, which is incorporated by reference herein in its entirety.

BACKGROUND

Some transportation services may provide transportation on demand, drawing from a transportation supply pool that includes vehicles of multiple types to meet the needs of those requesting transportation as the needs arise. Including personal mobility vehicles such as bicycles and scooters in a dynamic transportation network may enable transportation requestors to complete portions of a journey more efficiently. However, unlocking a personal mobility vehicle at the start of a journey and/or locking the personal mobility vehicles at the end of the journey may be points of friction that delay trips or increase user frustration.

Many traditional systems for locking personal mobility vehicles may have drawbacks, especially when used in the context of a dynamic transportation network. For example, requiring users to lock a vehicle and then report, via an app, that the vehicle has been locked may result in users forgetting to do one or the other, decreasing vehicle security and user satisfaction. Poor information about lock state may result in users being recorded as having taken trips that are longer or shorter than the actual trip taken, may result in vehicles being marked unavailable when the vehicles are in fact available, and/or may result in vehicles being marked as available when the vehicles are unavailable, decreasing system efficiency and increasing user frustration. Accordingly, the instant disclosure identifies and addresses a need for additional and improved systems and methods for locks for wheeled vehicles.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 3A and 3B are illustrations of a wheel that is inhibited from rotating via the pin of a magnet-equipped lock.

Figure 1:
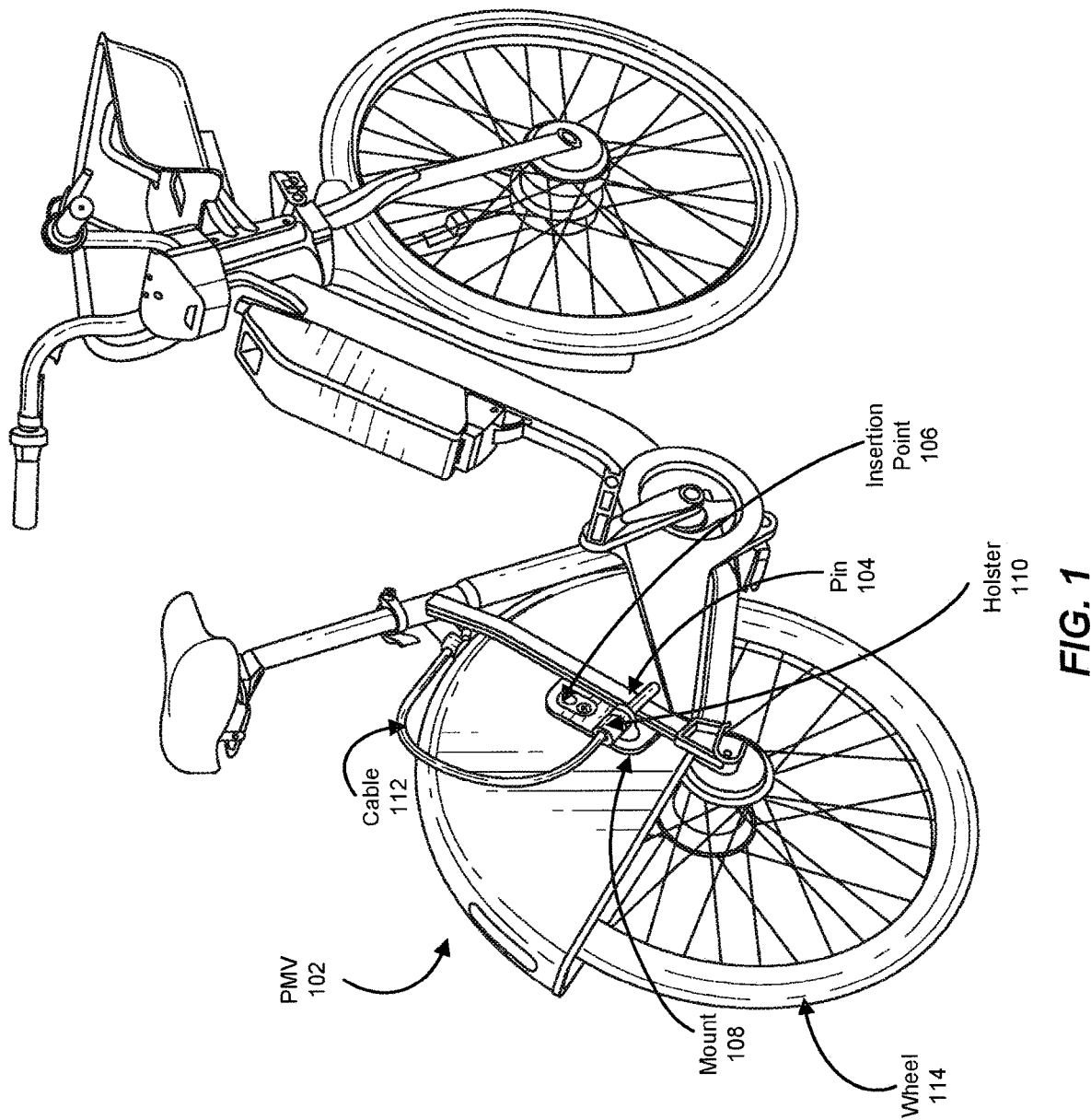
FIG. 1 is an illustration of an example magnet-equipped lock in context.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to an apparatus for a magnetic pin within a magnet-sensing lock. A single-sided lock with a pin may provide a number of advantages for wheeled vehicle and/or other applications. By using a magnet within the pin and a Hall Effect sensor within the lock, the apparatus may accurately detect the location of the pin and therefore the state of the lock. In some embodiments, the apparatus may determine whether the pin is inserted fully into the lock (e.g., the lock is locked), the pin is inserted partially into the lock, the pin is not inserted in the lock (e.g., the lock is unlocked), and/or that a foreign object that is not the pin is inserted into the lock. In one embodiment, the apparatus may use information about state changes of the lock to produce a state where a recently unlocked lock cannot be accidentally re-locked by reinserting the pin. By using a magnet within the pin to track the state of the lock, the apparatus may improve both the user experience and the security of the lock. In some embodiments, the lock may be affixed to a wheeled vehicle that is associated with a dynamic transportation network managed by a dynamic transportation matching system and/or may communicate with a dynamic transportation matching system about the state of the lock.

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include road-going vehicles (e.g., cars, light trucks, etc.). Furthermore, the dynamic transportation network may include personal mobility vehicles. In some embodiments, a dynamic transportation network may include autonomous vehicles (e.g., self-driving cars) that may be capable of operating with little or no input from a human operator.

FIG. 1 illustrates an example personal mobility vehicle (PMV) with a lock. As illustrated in FIG. 1, a PMV 102 may have an integrated lock with a mount 108 that includes an insertion point 106 into which a pin 104 may be inserted to place the lock into a locked state and inhibit motion of a wheel 114. In some embodiments, pin 104 may be affixed to PMV 102 with a cable 112. In some examples, pin 104 may be holstered in a holster 110. Although illustrated in FIG. 1 as a lock for a bicycle, the apparatus described herein may include any type or form of lock that includes an insertable component and a housing. For example, the apparatus described herein may be implemented as a vehicle lock, a padlock, a U-lock, a cable lock, a door lock, and/or any other suitable type of lock. In some examples, the apparatus described herein may be a lock for a scooter or other type of wheeled vehicle. In some examples, securing PMV 102 to an object such as a pillar, railing, lamp post, and/or bike rack may be a secondary measure that further increases the difficulty of moving PMV 102, in addition to the difficulty in moving PMV 102 caused by inhibiting the movement of the wheel. In some embodiments, lock may be positioned on PMV 102 to facilitate locking PMV 102 to objects. In some examples, inhibiting the movement of a wheeled vehicle when the vehicle is not in use may deter theft of the vehicle. In some embodiments, the magnet-equipped lock may be built in to a fender and/or other structural component of PMV 102. In some embodiments, a magnet-equipped lock may include multiple pins, such as two pins that are each inserted between separate spokes of a wheel.

Figure 2:
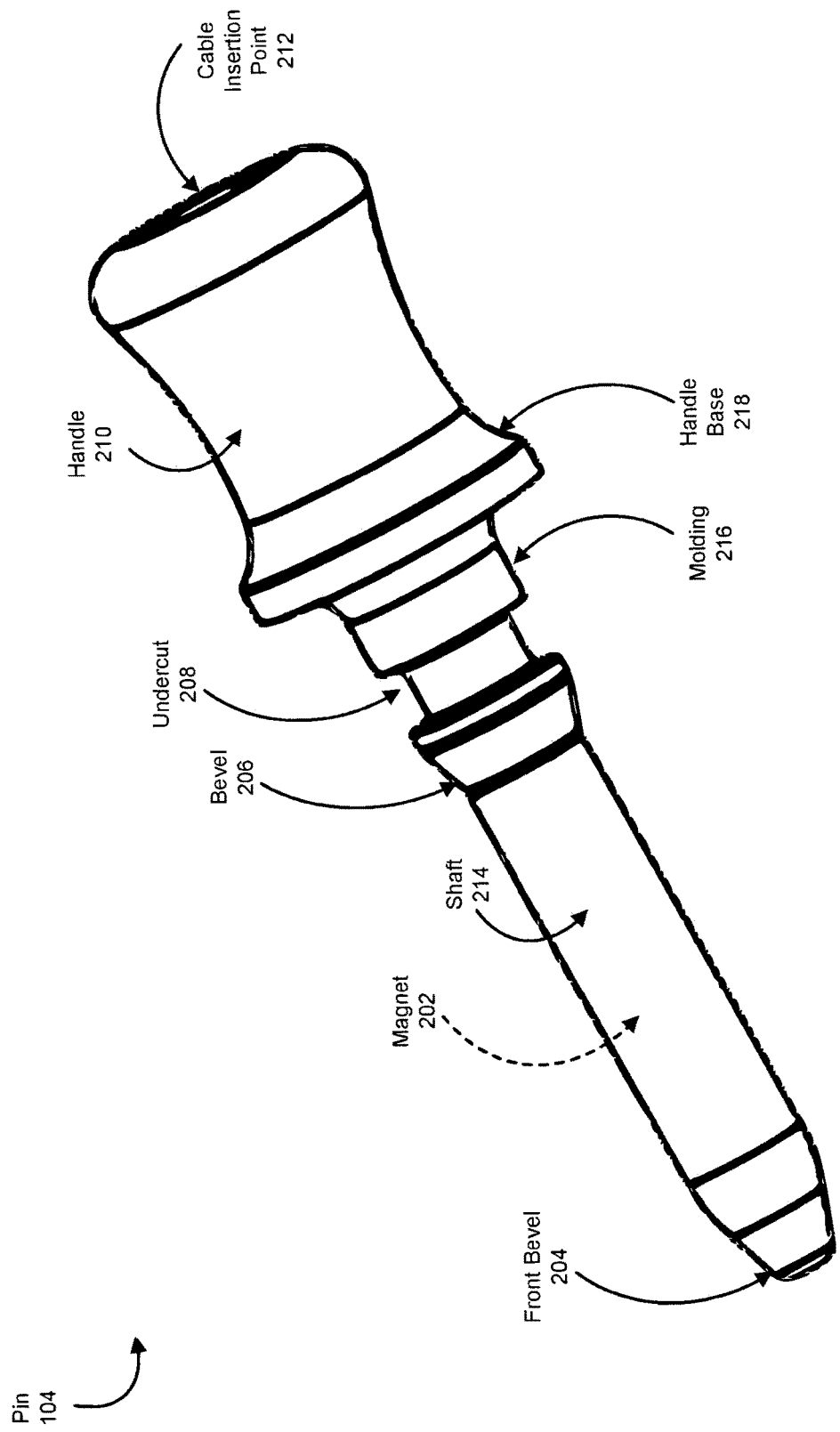
FIG. 2 is an illustration of an example insertable component of a magnet-equipped lock.

FIG. 2 illustrates pin 104 in detail. As illustrated in FIG. 2, pin 104 may have a bevel 206 leading to an undercut 208. In some examples, bevel 206 may push a slider out of the way as pin 104 enters the insertion point of a mount and the slider may then engage with undercut 208 to lock pin 104 in place within the mount and prevent pin 104 from being removed from the mount. In one embodiment, undercut 208 may be defined by a concavity in between bevel 206 and molding 216. In some embodiments, bevel 206 may not be present and pin 104 may have substantially parallel sides leading up to undercut 208. In one embodiment, pin 104 may have a front bevel 204 that pushes a slider and/or other components of a lock out of the way as pin 104 enters an insertion point of the lock. In some embodiments, front bevel 204 may lead to a shaft 214 with substantially parallel sides. In one embodiment, pin 104 may have a handle 210 that is contoured to be easily grasped by a user. In some embodiments, handle 210 may be substantially wider than shaft 214. In one embodiment, handle 210 may have a flared base and/or rounded top. For example, handle base 218 may be larger than the opening of insertion point 106, preventing pin 104 from being inserted into mount 108 past molding 216. In some embodiments, pin 104 may have a cable insertion point 212 at the top of handle 210. In one embodiment, cable 112 may connect to pin 104 via cable insertion point 212. In some embodiments, cable insertion point 212 may enable cable 112 to rotate relative to pin 104.

In one embodiment, shaft 214 may contain a magnet 202 (not shown) that sensors on a lock mount may detect in order to determine the current location and/or position of pin 104. In some embodiments, magnet 202 may extend through and/or past undercut 208. For example, magnet 202 may be half an inch long, an inch long, an inch and a half long, or two inches long. In some embodiments, magnet 202 may have a positive pole and a negative pole. In some embodiments, magnet 202 may be positioned within pin 104 such that one pole of magnet 202 is near a magnetic sensor in a lock housing when pin 104 is fully inserted into the lock housing. In some embodiments, magnet 202 may be cylindrical in shape. Additionally or alternatively, magnet 202 may be rectangular in shape. In some embodiments, magnet 202 may be oriented within pin 104 such that the positive pole of magnet 202 is towards the front of pin 104 (e.g., front bevel 204) and the negative pole of magnet 202 is towards the handle of pin 104 (e.g., handle 210). Alternatively, magnet 202 may be oriented in the opposite direction with the positive pole towards the handle and the negative pole towards the front of the pin.

FIGS. 3A and 3B illustrate a wheel that is inhibited from rotating via the pin of a magnet-equipped lock. As illustrated in FIG. 3A, wheel 114 may be free to rotate a small amount in rotation direction 302 before spoke 304 encounters pin 104. However, in FIG. 3B, after wheel 114 has rotated slightly in rotation direction 302, pin 104 inserted between two spokes of wheel 114 and held in place by mount 108 may inhibit further rotation of wheel 114 by preventing spoke 304 from passing pin 104 in due to the spokes being unable to rotate past pin 104, limiting the rotation of wheel 114 to a very small angle and impeding the movement of a wheeled vehicle of which wheel 114 is a part. For example, when wheel 114 starts to rotate in rotation direction 302, spoke 304 may come into contact with pin 104 and be unable to continue moving due to pin 104 being locked in place by mount 108, preventing wheel 114 from rotating any further in rotation direction 302. In some embodiments, pin 104 may be held in place by mount 108, not illustrated in FIGS. 3A and 3B. In some embodiments, pin 104 may, when inserted, go entirely through wheel 114 and emerge from the other side. In other embodiments, pin 104, when inserted, may reach far enough into wheel 114 to impede the movement of spokes but may not reach all the way through wheel 114 and/or may not emerge from the other side of wheel 114. Although illustrated as a bicycle wheel, in some embodiments, wheel 114 may represent a wheel of another type of wheeled vehicle, such as a scooter. Although a scooter wheel may have a smaller distance between the hub and the spokes and/or between individual spokes than a bicycle wheel, increasing the difficulty of fitting a lock component in between spokes, pin 104 may be dimensioned to fit between the spokes of a scooter wheel.

Figure 4:
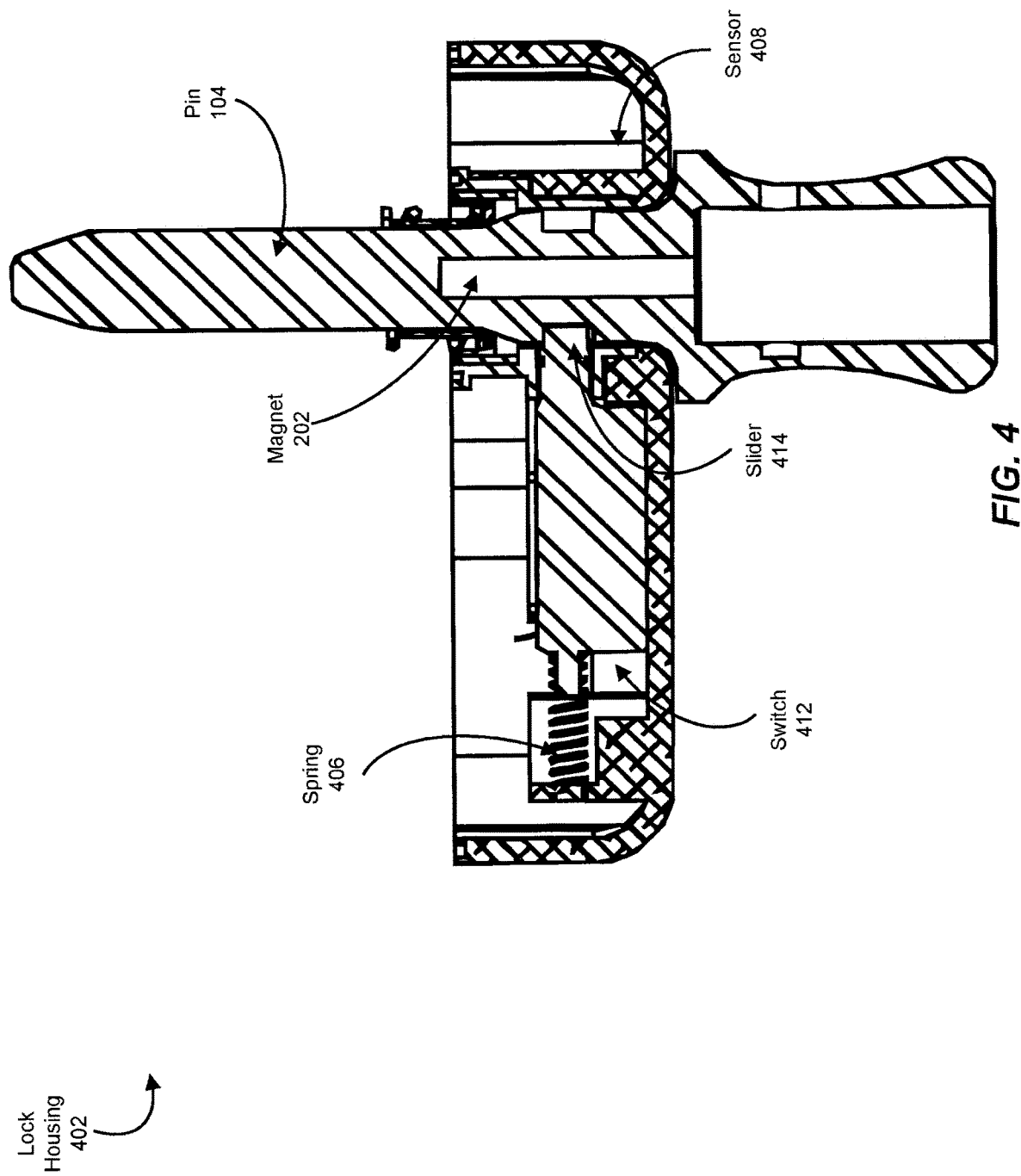
FIG. 4 is an illustration of an example magnet-equipped lock.

FIG. 4 illustrates an example lock housing with a pin inserted. As illustrated in FIG. 4, a lock housing 402 may include a slider 414 that, when retracted, permits the free movement of a pin 104 into and out of lock housing 402 and that, when extended, locks pin 104 in place if pin 104 is currently inserted into lock housing 402 and/or prevents pin 104 from being fully inserted into lock housing 402 if pin 104 is not already inserted at a time when slider 414 held in place in the extended position. In some embodiments, a spring 406 may be compressed when slider 414 is retracted and/or released when slider 414 is extended. In one embodiment, a switch 412 may track the motion and/or position of slider 414. In some embodiments, slider 414 may be moved via a cam driven by a motor. In some embodiments, lock housing 402 may include a sensor 408 that senses a magnetic field generated by a magnet 202 within pin 104. In one embodiment, sensor 408 may be a Hall Effect sensor. In some embodiments, the systems described herein may detect the position of pin 104 relative to lock housing 402 (e.g., including whether or not pin 104 is currently inserted) based on data from sensor 408 about the strength and/or polarity of the magnetic field generated by magnet 202. In some embodiments, magnet 202 may be a monopole magnet.

Figure 5C:
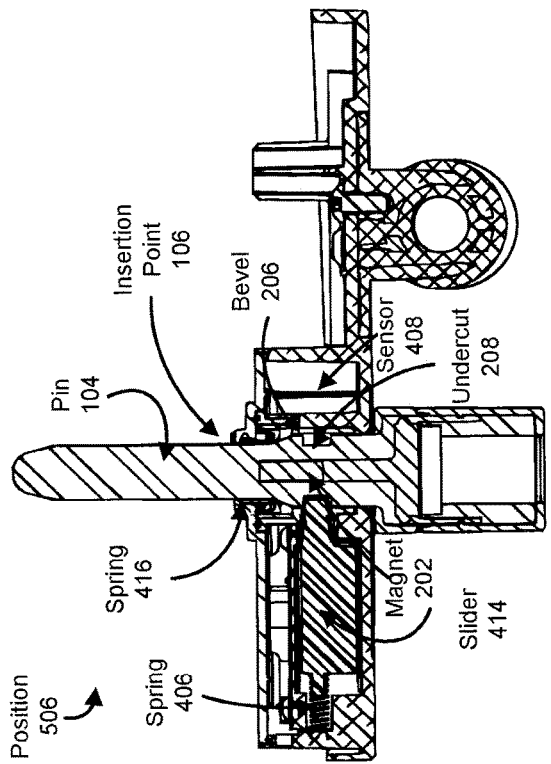
FIGS. 5A, 5B, 5C, and 5D are illustrations of multiple cutaway views of a pin inserted into a single-sided lock.
Figure 5D:
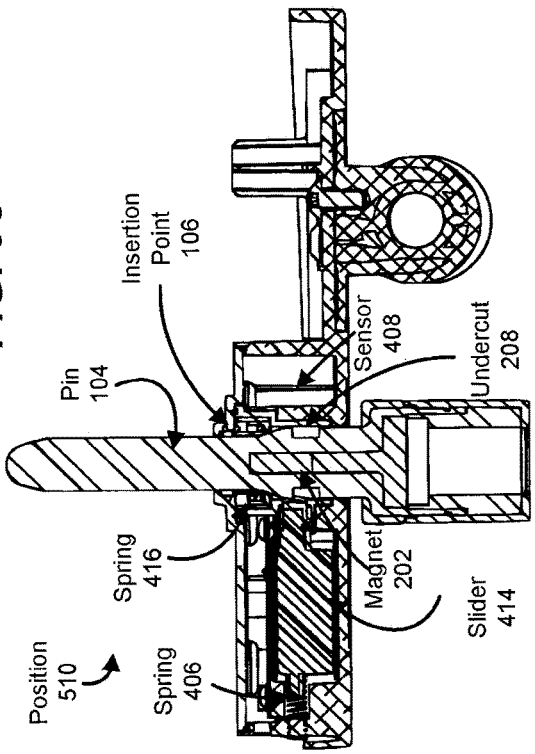
Figure 5A:
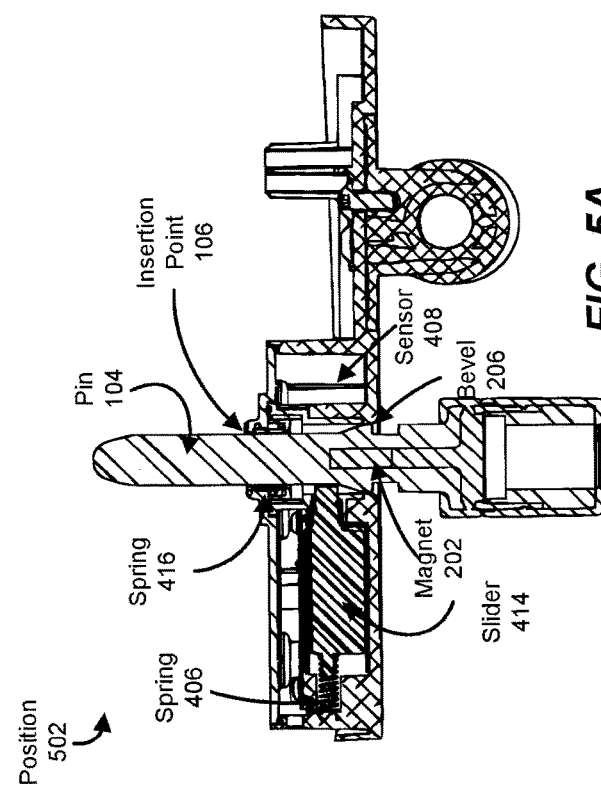

FIGS. 5A, 5B, 5C, and 5D illustrate a magnet-equipped pin in four different positions as the pin is inserted into a magnet-sensing lock. In FIG. 5A, at position 502, pin 104 is beginning to be inserted and slider 414 is fully extended. In some embodiments, slider 414 may be pushed into the extended position by spring 406. Additionally or alternatively, motor 404 (not visible) may lock slider 414 into the extended position, preventing pin 104 from being inserted into insertion point 106 past bevel 206 (and thus preventing the lock from locking). In one embodiment, spring 416 may be partially compressed by pin 104 as pin 104 is partially inserted into insertion point 106. In some examples, at this position, sensor 408 may sense a weak positive magnetic field originating from magnet 202 due to the positive pole of magnet 202 approaching sensor 408.

Figure 5B:
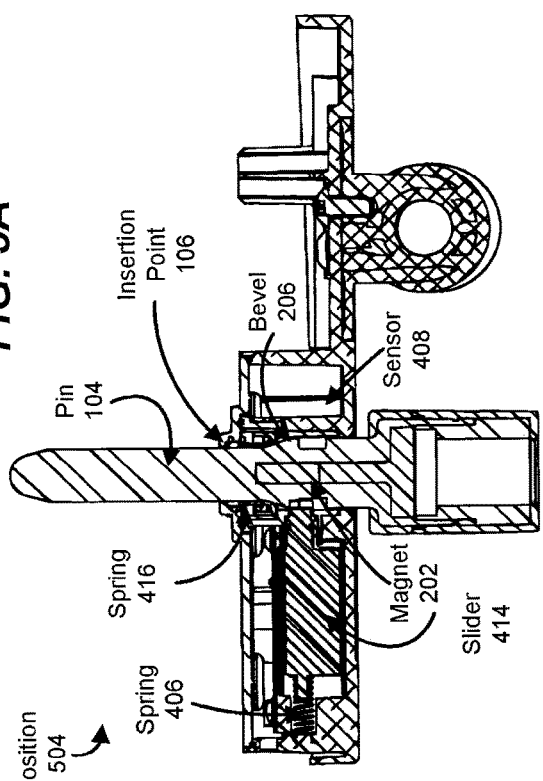

In FIG. 5B, at position 504, pin 104 may be inserted farther into insertion point 106 than in position 502, such that bevel 206 contacts slider 414 and pushes slider 414 into a retracted position, compressing spring 406. In some embodiments, pin 104 may also further compress spring 416. In some embodiments, sensor 408 may detect a weak negative field originating from magnet 202 due to the positive pole of magnet 202 having passed sensor 408 and the negative pole of magnet 202 drawing near sensor 408.

In FIG. 5C, at position 506, pin 104 may be fully inserted into insertion point 106 such that bevel 206 has moved past the head of slider 414. In one embodiment, spring 406 may expand, pushing the head of slider 414 into undercut 208 in pin 104. In some examples, motor 404 may lock slider 414 into place, preventing pin 104 from being removed from insertion point 106 due to bevel 206 being unable to travel past the head of slider 414 (and therefore locking the lock). In some embodiments, pin 104 may fully compress spring 416 when pin 104 is fully inserted into insertion point 106. In one embodiment, sensor 408 may detect a strong negative magnetic field originating from magnet 202 due to the negative pole of magnet 202 being close to sensor 408.

In FIG. 5D, at position 510, motor 404 may move slider 414 into the retracted position, compressing spring 406 and removing slider 414 from undercut 208 of pin 104. In one embodiment, spring 416 may expand, ejecting pin 104 from insertion point 106 (and unlocking the lock). In some embodiments, motor 404 may then lock slider 414 into an extended state, preventing the immediate re-insertion of pin 104 into insertion point 106. In some examples, if pin 104 is ejected from insertion point 106, sensor 408 may sense first a weak negative field and then a weak positive field, followed by no magnetic field, from magnet 202 as first the negative then the positive pole of magnet 202 pass sensor 408 as pin 104 is ejected.

Figure 6:
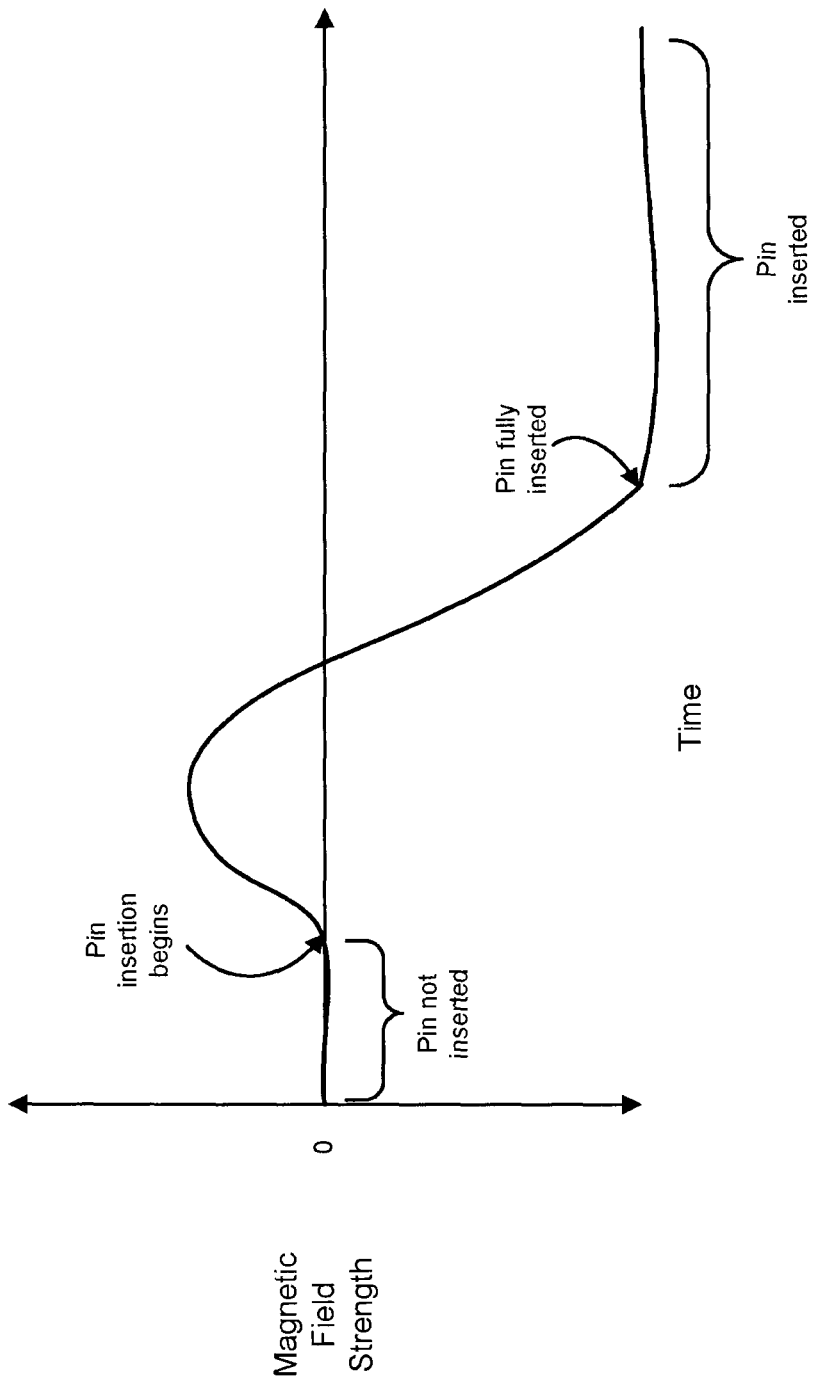
FIG. 6 is an example chart of magnetic field strength over time.

FIG. 6 is an example chart of fluctuating magnetic field strength between a monopole magnet and a magnetic field sensor over time. As illustrated in FIG. 6, a magnetic field sensor within a lock housing may initially detect no (or minimal) magnetic field when a magnet within an insertable lock component (e.g., a pin) is at a distance from the magnetic field sensor. When the pin begins being inserted, the magnetic field sensor may detect an increasingly strong field with a positive polarity due to the positive pole of the magnet approaching the magnetic field sensor. As the pin is being inserted and the positive pole of the magnet within the pin passes the magnetic field sensor, the sensor may detect an increasingly strong field with a negative polarity as the negative pole of the magnet becomes closer to the sensor than the positive pole. Once the pin is fully inserted and the magnet is no longer moving, the magnetic field sensor may detect a stable reading for the strength of the magnetic field. In some examples, by examining the current information about the magnetic field, the systems described herein may determine the position of an insertable lock component such as a pin relative to the lock housing. For example, if there is a strong negative magnetic field, the pin may be inserted in the lock housing with the negative pole of the magnet relatively near to the magnetic field sensor. Additionally or alternatively, the systems described herein may determine the motion of the pin based on changes in information about the magnetic field. For example, if the field was strong and negative and is now moving towards zero, the pin may be in the process of being removed from the lock housing. Examples of a magnetic field sensor may include, without limitation, a Hall Effect sensor, a magneto-diode, a magneto-transistor, any of various types of magnetometer, a magneto-optical sensor, and/or any other suitable type of magnetic field sensor. Although described as an apparatus with the magnet within the pin oriented with the positive pole of the magnet towards the front of the pin and the negative pole of the magnet oriented towards the handle of the pin, the systems described herein may also detect magnetic fields generated by a magnet in the opposite orientation (e.g., with the negative pole towards the front of the pin), in which case the systems described herein may determine that a weak negative field indicates that the pin is in the process of being inserted and/or a strong positive field indicates that the pin is fully inserted.

Figure 7:
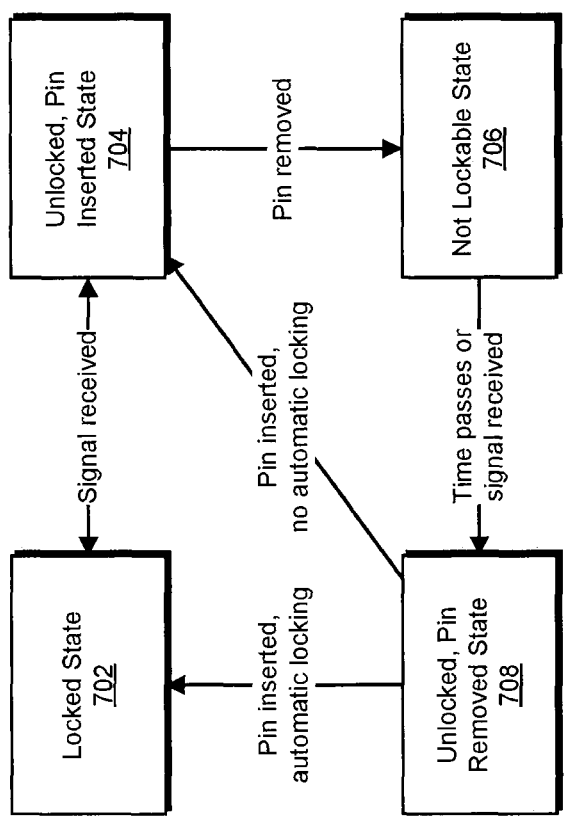
FIG. 7 is an example state diagram for a magnet-equipped lock.

FIG. 7 is an example state diagram for a magnet-equipped lock. In some embodiments, a lock may be in a locked state 702 when an insertable component such as a pin is inserted into a lock housing and held in place (e.g., by a slider inserted into an undercut in the pin). In some examples, the systems described herein may receive a signal (e.g., from a dynamic transportation matching system, a dock, a mobile device, or from any other suitable device or system) to unlock the lock, and may proceed to an unlocked, pin inserted state 704. In some embodiments, the lock may be designed so that the pin is automatically ejected from the lock once unlocked (e.g., via a spring that is compressed when the pin is inserted). Additionally or alternatively, a user may remove the pin from the lock.

In some embodiments, immediately following the removal of the pin, the lock may enter not lockable state 706. For example, a slider and/or other lock component may extend and obstruct the insertion point and/or the insertion point may close. In one embodiment, a motor may rotate a cam that pushes a slider into the extended position, obstructing the insertion point. By entering not lockable state 706, the systems described herein may prevent a user from inadvertently re-locking the lock. For example, a user may attempt to place the pin back into the lock. In some examples, the lock may move to unlocked, pin removed state 708 after the passage of a predetermined amount of time, such as five seconds, ten seconds, and/or a minute. Additionally or alternatively, the lock may move to unlocked, pin removed state 708 after receiving a signal (e.g., from a dynamic transportation matching system) and/or sensor data (e.g., indicating that the pin has been inserted into a holster). In some embodiments, a holster for the pin may also include a magnetic field sensor and/or additional type of sensor that enables the systems described herein to determine whether the pin is inserted into the holster. In one embodiment, a holster may also include a mechanism for securing the pin in place once the pin is inserted (e.g., to prevent the pin from bouncing out of the holster during operation of a vehicle to which the lock is affixed).

In some embodiments, the lock may automatically lock (e.g., secure the pin in place) upon insertion of the pin. For example, a spring may push a slider into place that secures the pin within the lock housing. In these embodiments, upon insertion of the pin, the lock may move to locked state 702. Additionally or alternatively, the lock may not automatically lock upon insertion of the pin, and may instead move to unlocked, pin inserted state 704 upon insertion of the lock and may move to locked state 702 upon receiving a signal (e.g., from a dynamic transportation matching system). In some embodiments, if the electronic components of the lock reset (e.g., due to temporary loss of power), the systems described herein may immediately ascertain the current state of the lock once the electronic components of the lock are again functional.

Figure 8:
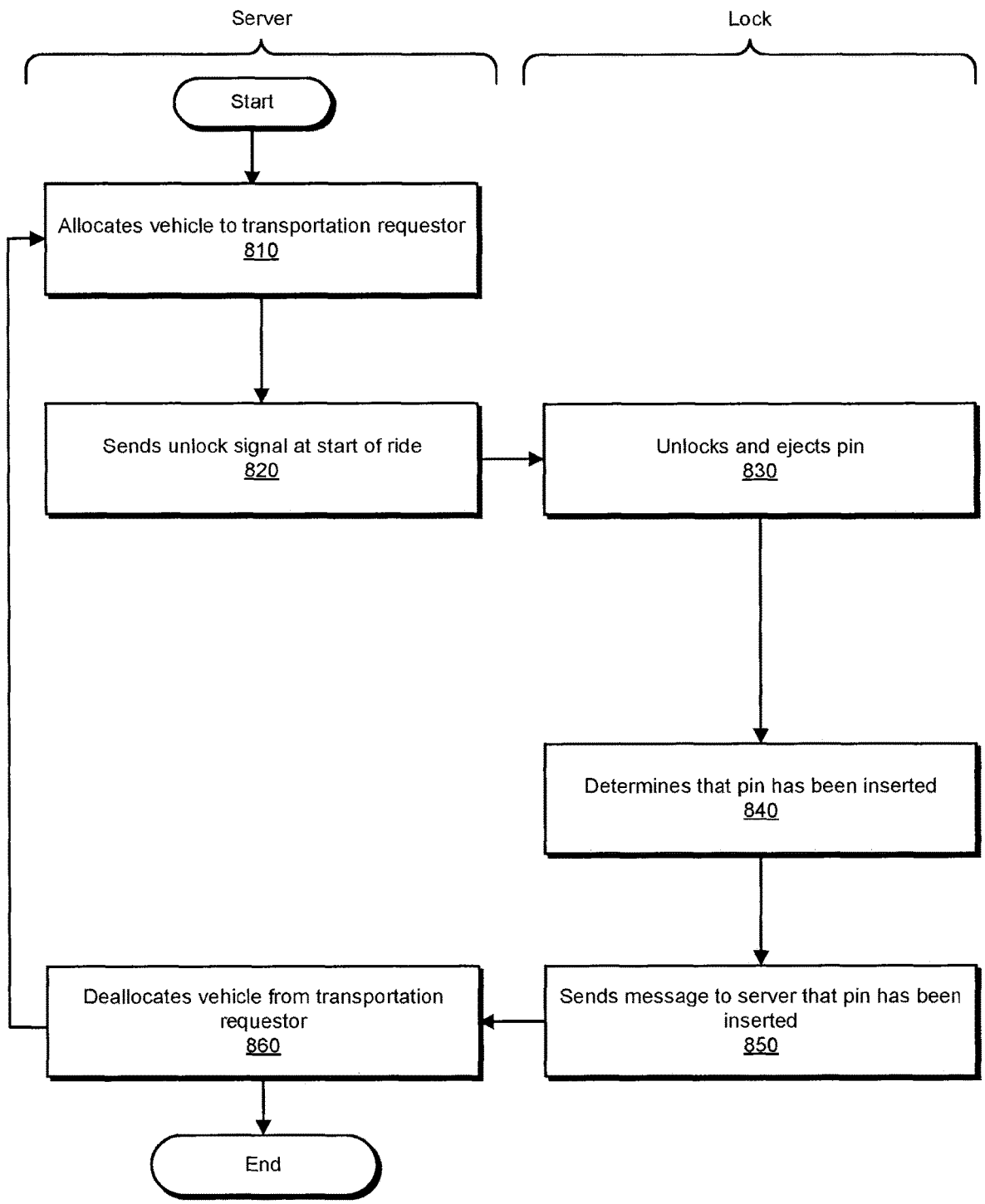
FIG. 8 is flow diagram of example communications between a server and a magnet-equipped lock.

FIG. 8 is a flow diagram that illustrates an example set of interactions between a server and a lock. In some embodiments, the lock may be affixed to a wheeled vehicle that is associated with a dynamic transportation network managed by a dynamic transportation matching system and/or the lock may receive signals from the dynamic transportation matching system. In one example, a transportation requestor (or other user) may request transportation and the dynamic transportation matching system may match the transportation requestor to a wheeled vehicle to which the lock is affixed. In some examples, the transportation requestor may request transportation via a personal computing device (e.g., laptop, mobile phone, tablet, etc.), a docking terminal, an Internet-of-Things device, and/or any other suitable computing device. At step 810, a server of the dynamic transportation matching system may allocate the vehicle to the transportation requestor. In some examples, at step 820, the dynamic transportation matching system and/or server may then send an unlock signal to the lock. At step 830, upon receiving the signal, the lock may unlock, facilitating movement of the vehicle. In some embodiments, the unlock signal may place the lock into unlocked, pin inserted state 704 and/or the dynamic transportation matching system may prompt the transportation requestor to remove the pin from the lock. Additionally or alternatively, at step 830, the pin may be ejected from the lock (e.g., by a spring) upon receiving the unlock signal and the lock may be in not lockable state 706. In some embodiments, the dynamic transportation matching system may provide troubleshooting information relative to the lock. For example, if the pin is obstructed from being ejected from the lock (e.g., by the transportation requestor's hand), the dynamic transportation matching system may send a message to a device operated by the transportation requestor alerting the transportation requestor to the issue. In one embodiment, the dynamic transportation matching system may receive information about the state of the lock by receiving information from a magnetic field sensor in the lock housing.

In some examples, the dynamic transportation matching system may not deallocate the wheeled vehicle from the transportation requestor until the dynamic transportation matching system detects that the lock is in locked state 702 at the end of the trip. For example, at step 840, the lock may determine that the pin has been inserted and, at step 850, the lock may send a signal to the server indicating that the pin has been inserted. In one example, the dynamic transportation matching system may send reminders to the transportation requestor to lock the lock if the dynamic transportation matching system detects that the transportation requestor has moved away from the vehicle and/or a predetermined amount of time has passed since the vehicle has ceased moving and the pin is not inserted into the lock. In some examples, upon receiving the message that the lock is locked, at step 860, the dynamic transportation matching system may deallocate the vehicle from the transportation requestor. In some embodiments, by detecting the location of the pin and thus the state of the lock, the systems described herein may enable a dynamic transportation matching system to deallocate vehicles from transportation requestors at the end of a ride without requiring additional intervention from transportation requestors (e.g., updating the ride status via an app).

Figure 9:
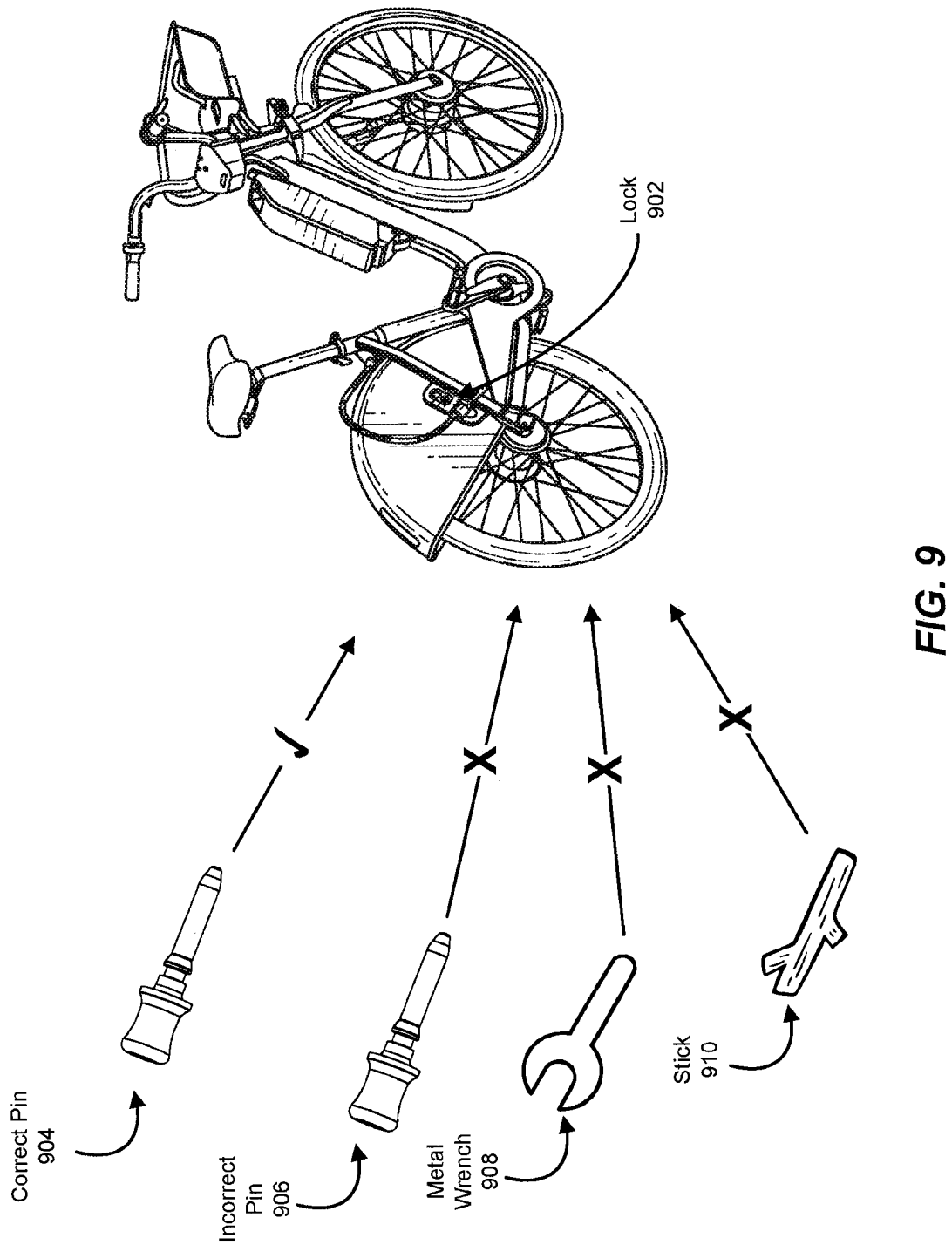
FIG. 9 is an illustration of example objects that may be inserted into a magnet-equipped lock.

FIG. 9 illustrates a variety of objects that could be inserted into the insertion point of a lock housing. In some embodiments, a magnet-equipped lock may be capable of detecting whether or not an object inserted into the lock housing is the insertable lock component that is part of the lock. For example, if a stick 910 is inserted into a lock 902, a magnetic field sensor of lock 902 may determine that stick 910 does not produce a magnetic field and the systems described herein may determine that stick 910 is therefore not correct pin 904 for lock 902. In another example, if metal wrench 908 is inserted into lock 902, the systems described herein may similarly determine that metal wrench 908 is not correct pin 904 due to the lack of a magnetic field and/or a magnetic field that does not match the expected profile of correct pin 904. In some embodiments, an insertable lock component may include additional safeguards against imitation, such as a magnet that is composed of small magnets of varying strengths and positions, creating a barcode-like effect, and/or an additional identifier such as a radio-frequency identification (RFID) chip. In some examples, lock 902 may determine that incorrect pin 906 is not correct pin 904 based on the incorrect magnetic field signature and/or RFID chip. In some examples, the systems described herein may detect that a magnetic field signature is incorrect by detecting a different magnitude and/or polarity of magnetic field than expected at various stages of insertion of the pin. In some examples, lock 902 may not fully lock (e.g., may not secure an inserted object in place) unless correct pin 904 is inserted into lock 902. In some examples, a server that communicates with lock 902 (e.g., a dynamic transportation matching system server) may perform an action in response to receiving a message from lock 902 indicating that an incorrect object has been inserted into lock 902. For example, the server may decline to deallocate a vehicle to which lock 902 is attached, send a message to a transportation requestor to whom the vehicle is currently allocated, and/or place an alert in a file associated with the transportation requestor indicating that the transportation requestor attempted to tamper with lock 902. In one embodiment, the systems described herein may deactivate electronic assistance functions of a vehicle (e.g., an electronic bicycle or scooter) in response to detecting potential tampering with lock 902. In some embodiments, the lock may eject incorrect objects placed into the insertion point (e.g., via a spring). In some embodiments, the systems described herein may have a predetermined tolerance, such as 10%, 15%, or 20%, for magnetic field strength when comparing the observed magnetic field strength when an object is being inserted into the lock housing to an expected magnetic field strength of correct pin 904.

Figure 10:
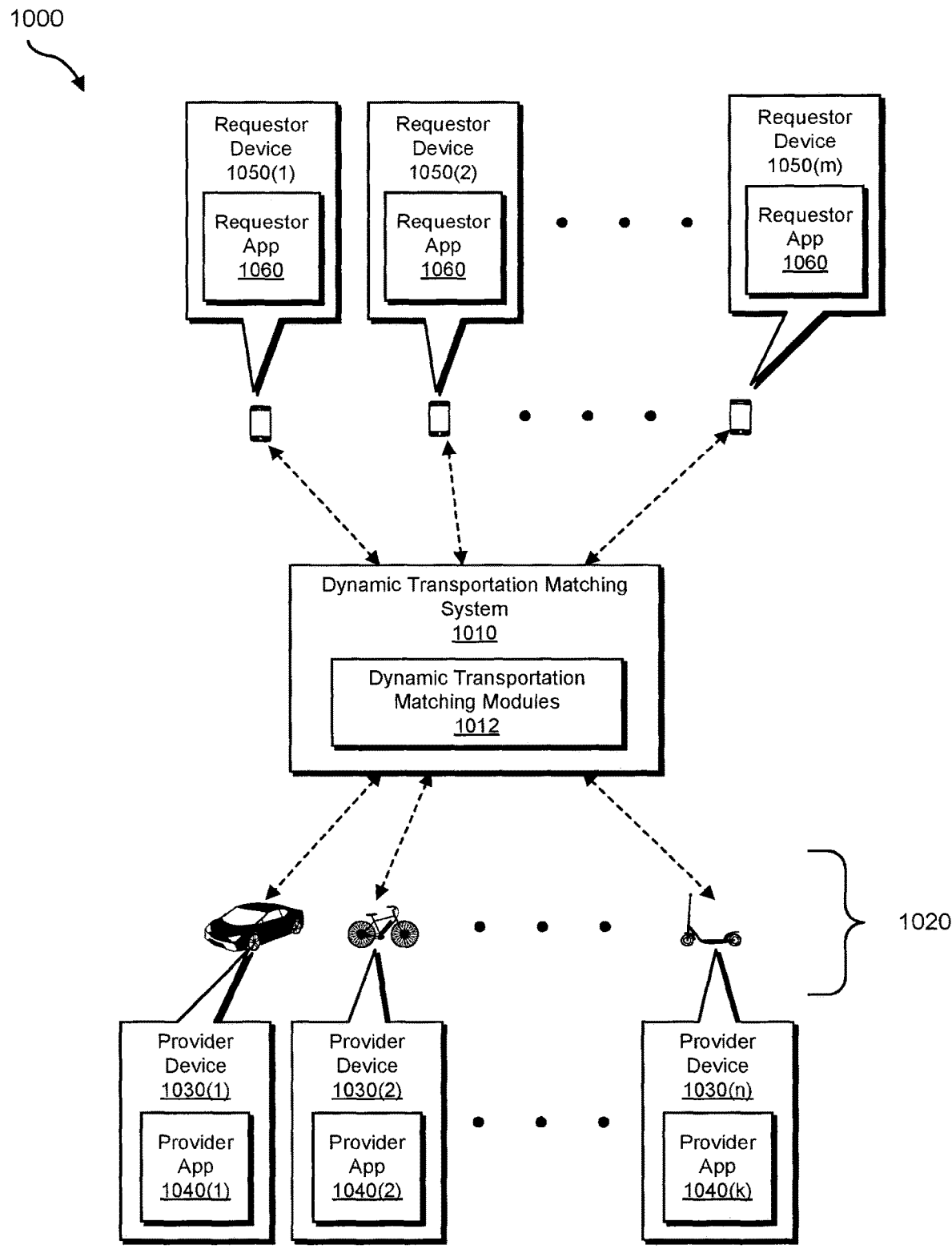
FIG. 10 is a block diagram of an example system for a dynamic transportation matching system.

FIG. 10 illustrates an example system 1000 for matching transportation requests with a dynamic transportation network that includes personal mobility vehicles. As shown in FIG. 10, a dynamic transportation matching system 1010 may be configured with one or more dynamic transportation matching modules 1012 that may perform one or more of the steps described herein. Dynamic transportation matching system 1010 may represent any computing system and/or set of computing systems capable of matching transportation requests. Dynamic transportation matching system 1010 may be in communication with computing devices in each of a group of vehicles 1020. Vehicles 1020 may represent any vehicles that may fulfill transportation requests. In some examples, vehicles 1020 may include disparate vehicle types and/or models. For example, vehicles 1020 may include road-going vehicles and personal mobility vehicles. In some examples, some of vehicles 1020 may be standard commercially available vehicles. According to some examples, some of vehicles 1020 may be owned by separate individuals (e.g., transportation providers). Furthermore, while, in some examples, many or all of vehicles 1020 may be human-operated, in some examples many of vehicles 1020 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 10 does not specify the number of vehicles 1020, it may be readily appreciated that the systems described herein are applicable to hundreds of vehicles, thousands of vehicles, or more. In one example, dynamic transportation matching system 1010 may coordinate transportation matchings within a single region for 50,000 vehicles or more on a given day. In some examples, vehicles 1020 may collectively form a dynamic transportation network that may provide transportation supply on an on-demand basis to transportation requestors.

As mentioned above, dynamic transportation matching system 1010 may communicate with computing devices in each of vehicles 1020. The computing devices may be any suitable type of computing device. In some examples, one or more of the computing devices may be integrated into the respective vehicles 1020. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 1010.

As shown in FIG. 10, vehicles 1020 may include provider devices 1030(1)-(n) (e.g., whether integrated into the vehicle, permanently affixed to the vehicle, temporarily affixed to the vehicle, worn by a driver of the vehicle, etc.). In some examples, provider devices 1030 may include a provider apps 1040(1)-(k). Provider apps 1040(1)-(k) may represent any application, program, and/or module that may provide one or more services related to operating a vehicle and/or providing transportation matching services. For example, provider apps 1040(1)(k) may include a transportation matching application for providers and/or one or more applications for matching personal mobility vehicles (PMVs) with requestor devices. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider applications 1040(1)-(k) may match the user of provider apps 1040(1)-(k) (e.g., a transportation provider) with transportation requestors through communication with dynamic transportation matching system 1010. In addition, and is described in greater detail below, provider apps 1040(1)-(k) may provide dynamic transportation management system 1010 with information about a provider (including, e.g., the current location of the provider and/or vehicle) to enable dynamic transportation management system 1010 to provide dynamic transportation matching and/or management services for the provider and one or more requestors. In some examples, provider apps 1040(1)-(k) may coordinate communications and/or a payment between a requestor and a provider. According to some embodiments, provider apps 1040(1)-(k) may provide a map service, a navigation service, a traffic notification service, and/or a geolocation service.

Additionally, as shown in FIG. 10, dynamic transportation matching system 1010 may communicate with requestor devices 1050(1)-(m). In some examples, requestor devices 1050 may include a requestor app 1060. Requestor app 1060 may represent any application, program, and/or module that may provide one or more services related to requesting transportation matching services. For example, requestor app 1060 may include a transportation matching application for requestors. In some examples, requestor app 1060 may match the user of requestor app 1060 (e.g., a transportation requestor) with transportation providers through communication with dynamic transportation matching system 1010. In addition, and as is described in greater detail below, requestor app 1060 may provide dynamic transportation management system 1010 with information about a requestor (including, e.g., the current location of the requestor) to enable dynamic transportation management system 1010 to provide dynamic transportation matching services for the requestor and one or more providers. In some examples, requestor app 1060 may coordinate communications and/or a payment between a requestor and a provider. According to some embodiments, requestor app 1060 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a ridesharing service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

Figure 11:
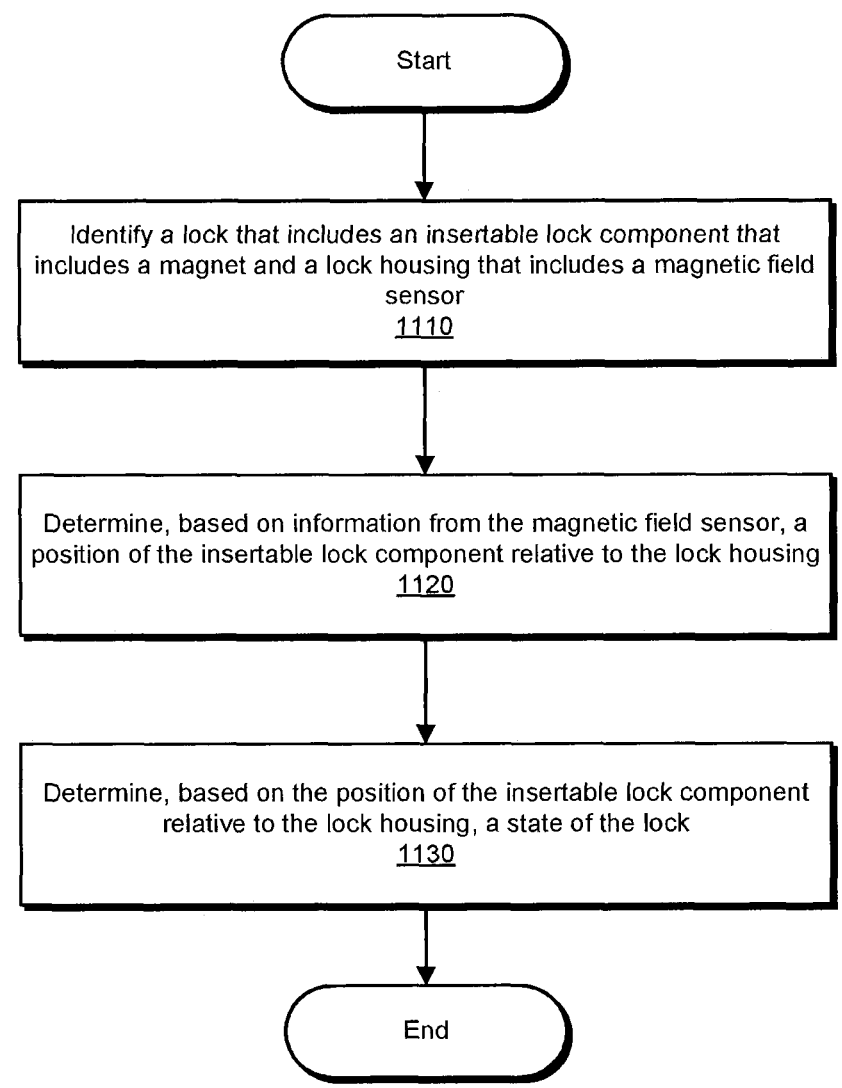
FIG. 11 is a flow diagram of an example method for determining the state of a magnet-equipped lock.

FIG. 11 illustrates an example method 1100 for determining the state of a lock based at least in part on data from a magnetic field sensor. As illustrated in FIG. 11, at step 1110, one or more of the systems described herein may identify a lock that includes an insertable lock component that includes a magnet and a lock housing that is shaped to define an insertion point for the insertable lock component and that includes a magnetic field sensor. At step 1120, one or more of the systems described herein may determine, based on information from the magnetic field sensor, a position of the insertable lock component relative to the lock housing. At step 1130, one or more of the systems described herein may determine, based on the position of the insertable lock component relative to the lock housing, a state of the lock.

In some embodiments, the systems described herein may send, to a server, a message indicating the state of the lock. In some examples, the systems described herein may detect that an object has been inserted into the insertion point, determine, based on information from the magnetic field sensor, that the object is not the insertable lock component, and decline to update the state of the lock in response to determining that the object is not the insertable lock component. In one embodiment, the systems described herein may send, to a computing device, a message indicating that the object that is not the insertable lock component has been inserted into the insertion point.

In some examples, the systems described herein may determine, based on information from the magnetic field sensor at two or more points in time, that the insertable lock component is being removed from the insertion point and move, in response to determining that the insertable lock component is being removed from the insertion point, at least one component of the lock housing such that the insertable lock component cannot be re-inserted into the insertion point. Additionally or alternatively, the systems described herein may receive instructions from a server to unlock the lock and move, in response to receiving the instructions from the server, at least one component of the lock housing such that the insertable lock component is ejected from the insertion point. In some embodiments, the systems described herein may determine, based on information from the magnetic field sensor, that the insertable lock component is within the insertion point and move, in response to determining that the insertable lock component is within the insertion point, at least one component of the lock housing such that the insertable lock component is held in place within the insertion point.

Figure 12:
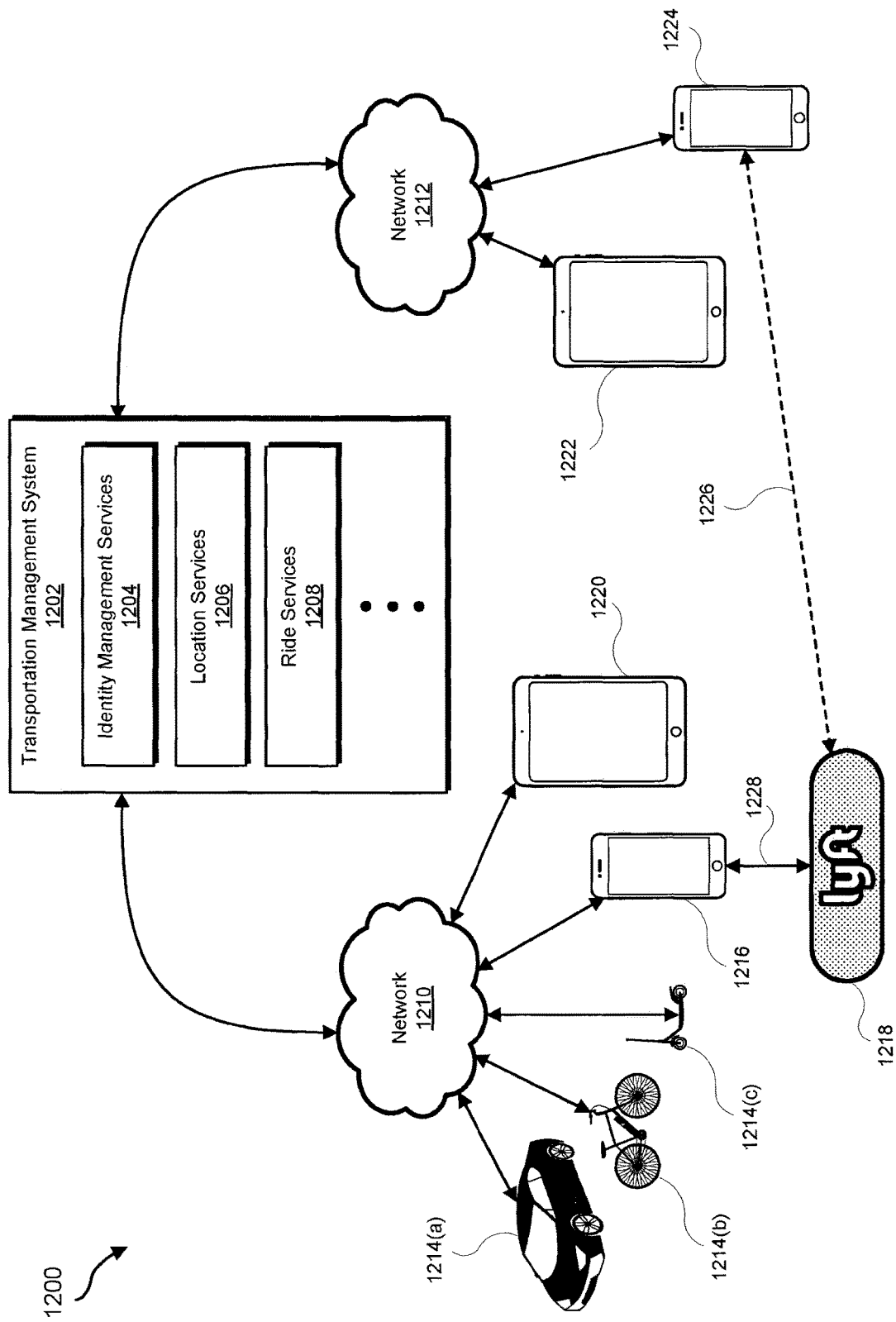
FIG. 12 is an illustration of an example requestor/provider management environment.

FIG. 12 shows a transportation management environment 1200, in accordance with various embodiments. As shown in FIG. 12, a transportation management system 1202 may run one or more services and/or software applications, including identity management services 1204, location services 1206, ride services 1208, and/or other services. Although FIG. 12 shows a certain number of services provided by transportation management system 1202, more or fewer services may be provided in various implementations. In addition, although FIG. 12 shows these services as being provided by transportation management system 1202, all or a portion of any of the services may be processed in a distributed fashion. For example, computations associated with a service task may be performed by a combination of transportation management system 1202 (including any number of servers, databases, etc.), one or more devices associated with a provider (e.g., devices integrated with managed vehicles 1214(a), 1214(b), and/or 1214(c); provider computing devices 1216 and tablets 1220; and transportation management vehicle devices 1218), and/or more or more devices associated with a ride requestor (e.g., the requestor's computing devices 1224 and tablets 1222). In some embodiments, transportation management system 1202 may include one or more general purpose computers, server computers, clustered computing systems, cloud-based computing systems, and/or any other computing systems or arrangements of computing systems. Transportation management system 1202 may be configured to run any or all of the services and/or software components described herein. In some embodiments, the transportation management system 1202 may include an appropriate operating system and/or various server applications, such as web servers capable of handling hypertext transport protocol (HTTP) requests, file transfer protocol (FTP) servers, database servers, etc.

In some embodiments, identity management services 1204 may be configured to perform authorization services for requestors and providers and/or manage their interactions and/or data with transportation management system 1202. This may include, e.g., authenticating the identity of providers and determining that they are authorized to provide services through transportation management system 1202. Similarly, requestors' identities may be authenticated to determine whether they are authorized to receive the requested services through transportation management system 1202. Identity management services 1204 may also manage and/or control access to provider and/or requestor data maintained by transportation management system 1202, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1202 may also manage and/or control access to provider and/or requestor data stored with and/or obtained from third-party systems. For example, a requestor or provider may grant transportation management system 1202 access to a third-party email, calendar, or task management system (e.g., via the user's credentials). As another example, a requestor or provider may grant, through a mobile device (e.g., 1216, 1220, 1222, or 1224), a transportation application associated with transportation management system 1202 access to data provided by other applications installed on the mobile device. In some examples, such data may be processed on the client and/or uploaded to transportation management system 1202 for processing.

In some embodiments, transportation management system 1202 may provide ride services 1208, which may include ride matching and/or management services to connect a requestor to a provider. For example, after identity management services module 1204 has authenticated the identity a ride requestor, ride services module 1208 may attempt to match the requestor with one or more ride providers. In some embodiments, ride services module 1208 may identify an appropriate provider using location data obtained from location services module 1206. Ride services module 1208 may use the location data to identify providers who are geographically close to the requestor (e.g., within a certain threshold distance or travel time) and/or who are otherwise a good match with the requestor. Ride services module 1208 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1208 may use rule-based algorithms and/or machine-learning models for matching requestors and providers.

Transportation management system 1202 may communicatively connect to various devices through networks 1210 and/or 1212. Networks 1210 and 1212 may include any combination of interconnected networks configured to send and/or receive data communications using various communication protocols and transmission technologies. In some embodiments, networks 1210 and/or 1212 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1210 and/or 1212 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 1002.12 family of standards, Bluetooth, Bluetooth Low Energy, Near Field Communication (NFC), Z-Wave, and ZigBee). In various embodiments, networks 1210 and/or 1212 may include any combination of networks described herein or any other type of network capable of facilitating communication across networks 1210 and/or 1212.

In some embodiments, transportation management vehicle device 1218 may include a provider communication device configured to communicate with users, such as drivers, passengers, pedestrians, and/or other users. In some embodiments, transportation management vehicle device 1218 may communicate directly with transportation management system 1202 or through another provider computing device, such as provider computing device 1216. In some embodiments, a requestor computing device (e.g., device 1224) may communicate via a connection 1226 directly with transportation management vehicle device 1218 via a communication channel and/or connection, such as a peer-to-peer connection, Bluetooth connection, NFC connection, ad hoc wireless network, and/or any other communication channel or connection. Although FIG. 12 shows particular devices communicating with transportation management system 1202 over networks 1210 and 1212, in various embodiments, transportation management system 1202 may expose an interface, such as an application programming interface (API) or service provider interface (SPI) to enable various third parties which may serve as an intermediary between end users and transportation management system 1202.

In some embodiments, devices within a vehicle may be interconnected. For example, any combination of the following may be communicatively connected: vehicle 1214, provider computing device 1216, provider tablet 1220, transportation management vehicle device 1218, requestor computing device 1224, requestor tablet 1222, and any, other device (e.g., smart watch, smart tags, etc.). For example, transportation management vehicle device 1218 may be communicatively connected to provider computing device 1216 and/or requestor computing device 1224. Transportation management vehicle device 1218 may establish communicative connections, such as connections 1226 and 1228, to those devices via any suitable communication technology, including, e.g., WLAN technologies implementing the IEEE 1002.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1202 using applications executing on their respective computing devices (e.g., 1216, 1218, 1220, and/or a computing device integrated within vehicle 1214), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1214 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1202. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 13:
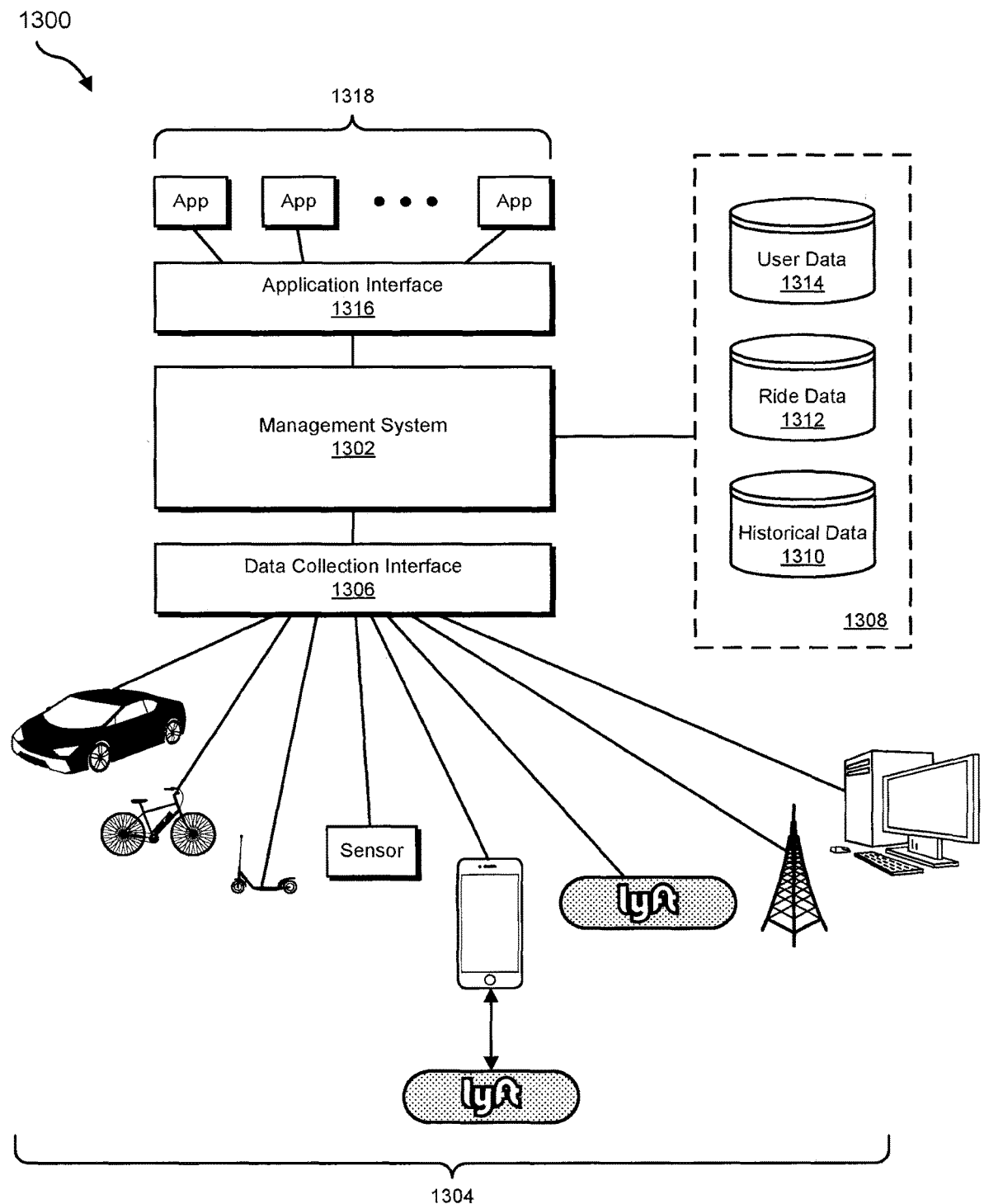
FIG. 13 is an illustration of an example data collection and application management system.

FIG. 13 shows a data collection and application management environment 1300, in accordance with various embodiments. As shown in FIG. 13, management system 1302 may be configured to collect data from various data collection devices 1304 through a data collection interface 1306. As discussed above, management system 1302 may include one or more computers and/or servers or any combination thereof. Data collection devices 1304 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1306 can include, e.g., an extensible device framework configured to support interfaces for each data collection device. In various embodiments, data collection interface 1306 may be extended to support new data collection devices as they are released and/or to update existing interfaces to support changes to existing data collection devices. In various embodiments, data collection devices may communicate with data collection interface 1306 over one or more networks. The networks may include any network or communication protocol as would be recognized by one of ordinary skill in the art, including those networks discussed above.

As shown in FIG. 13, data received from data collection devices 1304 can be stored in data store 1308. Data store 1308 may include one or more data stores, such as databases, object storage systems and services, cloud-based storage services, and other data stores. For example, various data stores may be implemented on a non-transitory storage medium accessible to management system 1302, such as historical data store 1310, ride data store 1312, and user data store 1314. Data stores 1308 can be local to management system 1302, or remote and accessible over a network, such as those networks discussed above or a storage-area network or other networked storage system. In various embodiments, historical data 1310 may include historical traffic data, weather data, request data, road condition data, or any other data for a given region or regions received from various data collection devices. Ride data 1312 may include route data, request data, timing data, and other ride related data, in aggregate and/or by requestor or provider. User data 1314 may include user account data, preferences, location history, and other user-specific data. Although certain data stores are shown by way of example, any data collected and/or stored according to the various embodiments described herein may be stored in data stores 1308.

As shown in FIG. 13, an application interface 1316 can be provided by management system 1302 to enable various apps 1318 to access data and/or services available through management system 1302. Apps 1318 may run on various user devices (including provider and requestor computing devices, such as those discussed above) and/or may include cloud-based or other distributed apps configured to run across various devices (e.g., computers, servers, or combinations thereof). Apps 1318 may include, e.g., aggregation and/or reporting apps which may utilize data 1308 to provide various services (e.g., third-party ride request and management apps). In various embodiments, application interface 1316 can include an API and/or SPI enabling third party development of apps 1318. In some embodiments, application interface 1316 may include a web interface, enabling web-based access to data 1308 and/or services provided by management system 1302. In various embodiments, apps 1318 may run on devices configured to communicate with application interface 1316 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A personal mobility vehicle locking system comprising:
    a pin comprising a magnet and an undercut along a shaft of the pin, the undercut configured to secure the pin in a locked position; and
    a lock for a wheel of a personal mobility vehicle, the lock comprising:
        a locking mechanism comprising a slider and configured to secure the pin in the locked position by positioning the slider into the undercut; and
        a sensor adjacent to the locking mechanism and configured to detect one or more positions of the pin relative to the sensor based on a magnetic field generated by the magnet that is detected by the sensor at the one or more positions,
    wherein the sensor is further configured to output information regarding a state of the lock based on the one or more positions of the pin relative to the sensor.

2. The personal mobility vehicle locking system of claim 1, wherein the information regarding the state of the lock is used by a dynamic transportation matching system to deallocate the personal mobility vehicle from a user of the personal mobility vehicle.

3. The personal mobility vehicle locking system of claim 1, wherein the state of the lock comprises one of a locked state, an unlocked state with pin inserted, a not lockable state, or an unlocked state with pin removed.

4. The personal mobility vehicle locking system of claim 1, wherein the information regarding the state of the lock is used by a dynamic transportation matching system to perform an action.

5. The personal mobility vehicle locking system of claim 1, wherein the locking mechanism further comprises a motor and a cam connected to the slider, and wherein the motor is configured to drive the slider into the undercut using the cam.

6. The personal mobility vehicle locking system of claim 1, wherein the pin further comprises a bevel along the shaft adjacent to the undercut, and wherein the locking mechanism further comprises a spring configured to move the slider over the bevel and engage the slider into the undercut in the locked position.

7. The personal mobility vehicle locking system of claim 1, further comprising a release component configured to disengage the slider from the undercut.

8. The personal mobility vehicle locking system of claim 1, wherein the sensor is further configured to detect a foreign object within the lock, and wherein an alert is transmitted by the personal mobility vehicle locking system to a transportation service provider based on detecting the foreign object.

9. The personal mobility vehicle locking system of claim 1, wherein the locking mechanism is further configured to adjust the slider to obstruct securing the pin in the locked position for a predetermined amount of time when the state of the lock is in an unlockable state.

10. The personal mobility vehicle locking system of claim 1, further comprising:
    a holster configured to secure the pin when the pin is removed from the lock.

11. The personal mobility vehicle locking system of claim 10, wherein the holster comprises an additional sensor configured to detect the magnetic field generated by the magnet.

12. A method comprising:
    detecting, using a sensor of a lock for a personal mobility vehicle, a strength of a magnetic field generated by a magnet within a pin of the lock;
    determining a position of the pin relative to the sensor based on the strength of the magnetic field at the position; and
    outputting information regarding a state of the lock based on the position of the pin relative to the sensor.

13. The method of claim 12, wherein the strength is a maximum strength at the position relative to strengths of the magnetic field at other positions of the pin relative to the sensor and the position indicates the pin is fully inserted into the lock.

14. The method of claim 13, further comprising deallocating the personal mobility vehicle from a user of the personal mobility vehicle based on the strength being the maximum strength.

15. A locking pin for a personal mobility vehicle, the locking pin comprising:
    a shaft having a first end of the locking pin and configured to be insertable into a lock;
    a handle at a second end of the locking pin; and
    a magnet within the shaft and spanning in a longitudinal direction of the shaft, wherein the magnet extends past an undercut of the shaft.

16. The locking pin of claim 15, wherein the shaft further comprises a bevel portion adjacent to the undercut and tapering down toward the first end.

17. The locking pin of claim 15, wherein the magnet has a first end extending toward the first end of the locking pin and a second end extending toward the second end of the locking pin, and wherein the first end of the magnet and the second end of the magnet have opposite polarities.

18. The locking pin of claim 15, wherein the handle is wider than the shaft.

19. The locking pin of claim 15, wherein the shaft has a bevel portion tapering down toward the first end.

\* \* \* \* \*